United States Patent
Kim et al.

(10) Patent No.: US 9,100,972 B2
(45) Date of Patent: Aug. 4, 2015

(54) METHOD FOR CONTROLLING INTER-CELL INTERFERENCE IN A WIRELESS COMMUNICATION SYSTEM THAT SUPPORTS A PLURALITY OF COMPONENT CARRIERS, AND BASE STATION APPARATUS FOR SAME

(75) Inventors: Jinmin Kim, Gyeonggi-do (KR); Sungho Moon, Gyeonggi-do (KR); Soyeon Kim, Gyeonggi-do (KR); Jiwoong Jang, Gyeonggi-do (KR)

(73) Assignee: LG ELECTRONICS INC., Seoul (KR)

(*) Notice: Subject to any disclaimer, the term of this patent is extended or adjusted under 35 U.S.C. 154(b) by 126 days.

(21) Appl. No.: 13/992,195

(22) PCT Filed: Dec. 7, 2011

(86) PCT No.: PCT/KR2011/009428
§ 371 (c)(1),
(2), (4) Date: Jun. 6, 2013

(87) PCT Pub. No.: WO2012/077974
PCT Pub. Date: Jun. 14, 2012

(65) Prior Publication Data
US 2013/0258895 A1    Oct. 3, 2013

Related U.S. Application Data

(60) Provisional application No. 61/420,324, filed on Dec. 7, 2010.

(51) Int. Cl.
*H04W 4/00* (2009.01)
*H04W 72/08* (2009.01)
(Continued)

(52) U.S. Cl.
CPC ......... *H04W 72/082* (2013.01); *H04J 11/0056* (2013.01); *H04L 5/001* (2013.01);
(Continued)

(58) Field of Classification Search
CPC ... H04W 72/06; H04W 72/08; H04W 72/082; H04W 72/10; H04L 5/001; H04L 5/0053; H04L 5/0055; H04L 5/0057; H04L 5/0062; H04L 5/0073; H04L 5/0007; H04J 11/0056
USPC ......... 370/252, 328–329, 331–333, 335–336, 370/338, 342–343, 345, 437, 441–442, 465, 370/479–480
See application file for complete search history.

(56) References Cited

U.S. PATENT DOCUMENTS 5,613,205 A * 3/1997 Dufour ..................... 455/440
8,423,019 B2 * 4/2013 Rao ......................... 455/434
(Continued)

FOREIGN PATENT DOCUMENTS

KR   10-2008-0108887 A   12/2008
KR   10-2008-0111393 A   12/2008
(Continued)

*Primary Examiner* — Kevin Mew
(74) *Attorney, Agent, or Firm* — McKenna Long & Aldridge LLP

(57) ABSTRACT

A method for controlling inter-cell interference in a wireless communication system that supports a plurality of component carriers (CCs) according to the present invention comprises the following steps: receiving priority information on the interference protection for each of a plurality of component carriers from at least one neighboring base station; measuring an intensity of the signal received from the at least one neighboring base station; and generating priority information for interference protection for each of a plurality of component carriers constructed for the base station, based on the received priority information and the measured intensity of the signal received from the at least one neighboring base station.

12 Claims, 11 Drawing Sheets

(51) Int. Cl.
   *H04J 11/00* (2006.01)
   *H04L 5/00* (2006.01)

(52) U.S. Cl.
   CPC ........... *H04L 5/0055* (2013.01); *H04L 5/0057* (2013.01); *H04L 5/0073* (2013.01); *H04L 5/0007* (2013.01); *H04L 5/0053* (2013.01); *H04L 5/0062* (2013.01)

(56) References Cited

U.S. PATENT DOCUMENTS

| | | | |
|---|---|---|---|
| 8,488,480 B2 * | 7/2013 | Han et al. | 370/252 |
| 8,599,748 B2 * | 12/2013 | Stamoulis et al. | 370/328 |
| 8,874,040 B2 * | 10/2014 | Li et al. | 455/63.1 |
| 2004/0106412 A1 * | 6/2004 | Laroia et al. | 455/448 |
| 2005/0058151 A1 * | 3/2005 | Yeh | 370/445 |
| 2009/0110087 A1 * | 4/2009 | Liu et al. | 375/260 |
| 2009/0130980 A1 * | 5/2009 | Palanki et al. | 455/63.1 |
| 2009/0252102 A1 * | 10/2009 | Seidel et al. | 370/329 |
| 2010/0222060 A1 * | 9/2010 | Zhang et al. | 455/436 |
| 2010/0298016 A1 * | 11/2010 | Madan et al. | 455/501 |
| 2011/0268217 A1 * | 11/2011 | Gormley et al. | 375/295 |
| 2012/0094679 A1 * | 4/2012 | Rao | 455/450 |
| 2013/0223258 A1 * | 8/2013 | Seo et al. | 370/252 |

FOREIGN PATENT DOCUMENTS

| | | |
|---|---|---|
| KR | 10-2009-0069119 A | 6/2009 |
| KR | 10-2010-0045391 A | 5/2010 |

* cited by examiner

FIG. 7
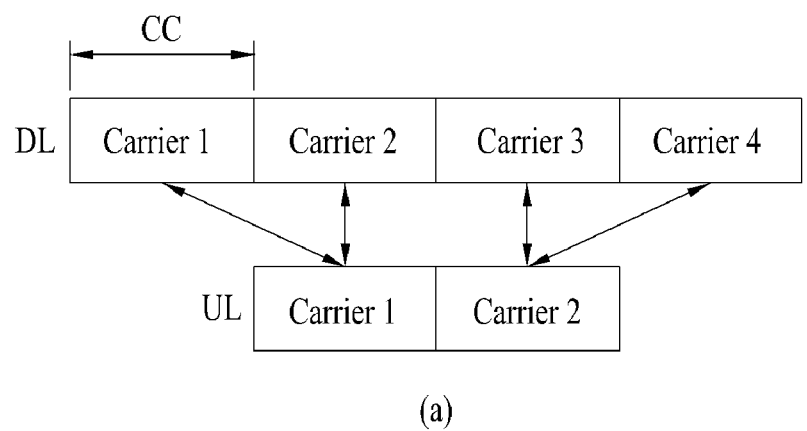
(a)
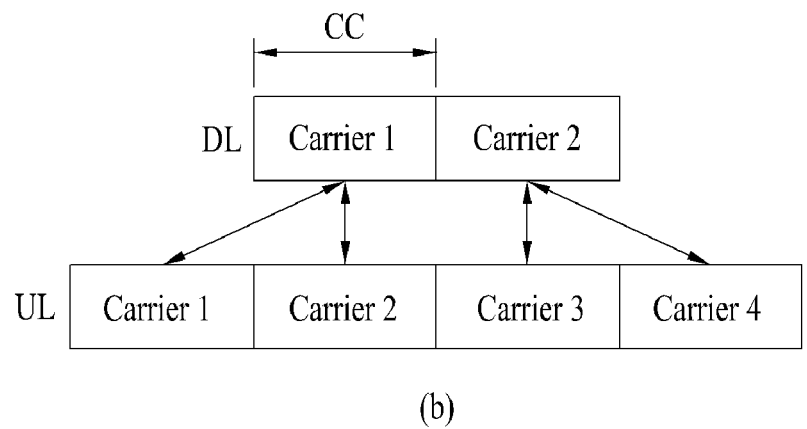
(b)

METHOD FOR CONTROLLING INTER-CELL INTERFERENCE IN A WIRELESS COMMUNICATION SYSTEM THAT SUPPORTS A PLURALITY OF COMPONENT CARRIERS, AND BASE STATION APPARATUS FOR SAME

This Application is a 35 U.S.C. §371 National Stage Entry of International Application No. PCT/KR2011/009428, filed Dec. 7, 2011, and claims the benefit of U.S. Provisional Application No. 61/420,324, filed Dec. 7, 2010 both of which are incorporated by reference in their entirety herein.

TECHNICAL FIELD

The present invention relates to a wireless communication, and more particularly, to a method of controlling inter-cell interference in a wireless communication system supportive of a plurality of component carriers and a base station apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a wireless communication, and more particularly, to a method of controlling inter-cell interference in a wireless communication system supportive of a plurality of component carriers.

Another object of the present invention is to provide a base station apparatus for controlling inter-cell interference in a wireless communication system supportive of a plurality of component carriers.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of controlling an inter-cell interference a base station in a wireless communication system supportive of a plurality of component carriers (CCs), according to the present invention may include receiving a priority information on an interference protection for each of a plurality of configured component carriers from at least one neighbor base station, measuring a signal strength of a signal received from the at least one neighbor base station, and generating a priority information for an interference protection for each of a plurality of component carriers configured in the base station based on the received priority information and the measured signal strength of the at least one neighbor base station. Preferably, the method may further include transmitting the generated priority information for the interference protection for the each of a plurality of the component carriers to the at least one neighbor base station. Preferably, the method may further include performing a scheduling for at least one user equipment served by the base station based on the generated priority information for the interference protection for the each of a plurality of the component carriers. Preferably, in the generating the priority information for the interference protection for the each of a plurality of the component carriers, for a priority for the interference protection in the at least one neighbor base station, a component carrier having a lowest or highest priority may be assigned in the base station. More preferably, a user equipment located at an edge of at least one cell served by the base station may be assigned to the component carrier having the highest priority assigned thereto in the base station. Preferably, in the generating the priority information for the interference protection for the each of a plurality of the component carriers, the priority may be generated as either a high level or a low level.

To further achieve these and other advantages and in accordance with the purpose of the present invention, a base station apparatus for controlling an inter-cell interference in a wireless communication system supportive of a plurality of component carriers (CCs) according to the present invention may include a receiver configured to receive a priority information on an interference protection for each of a plurality of configured component carriers from at least one neighbor base station and a processor configured to measure a signal strength of a signal received from the at least one neighbor base station, the processor configured to generate a priority information for an interference protection for each of a plurality of component carriers configured in the base station based on the received priority information and the measured signal strength of the at least one neighbor base station.

Advantageous Effects

According to various embodiments of the present invention of an inter-cell interference control scheme, interference between base stations in a heterogeneous network having base stations of various types exist therein can be efficiently controlled as well as in a homogeneous network, whereby communication performance such as throughput and the like can be considerably enhanced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 7 is a diagram for one example of a CA (carrier aggregation) system in a 3GPP LTE/LTE-A system as one example of a wireless communication system.

BEST MODE FOR INVENTION

Figure 1:
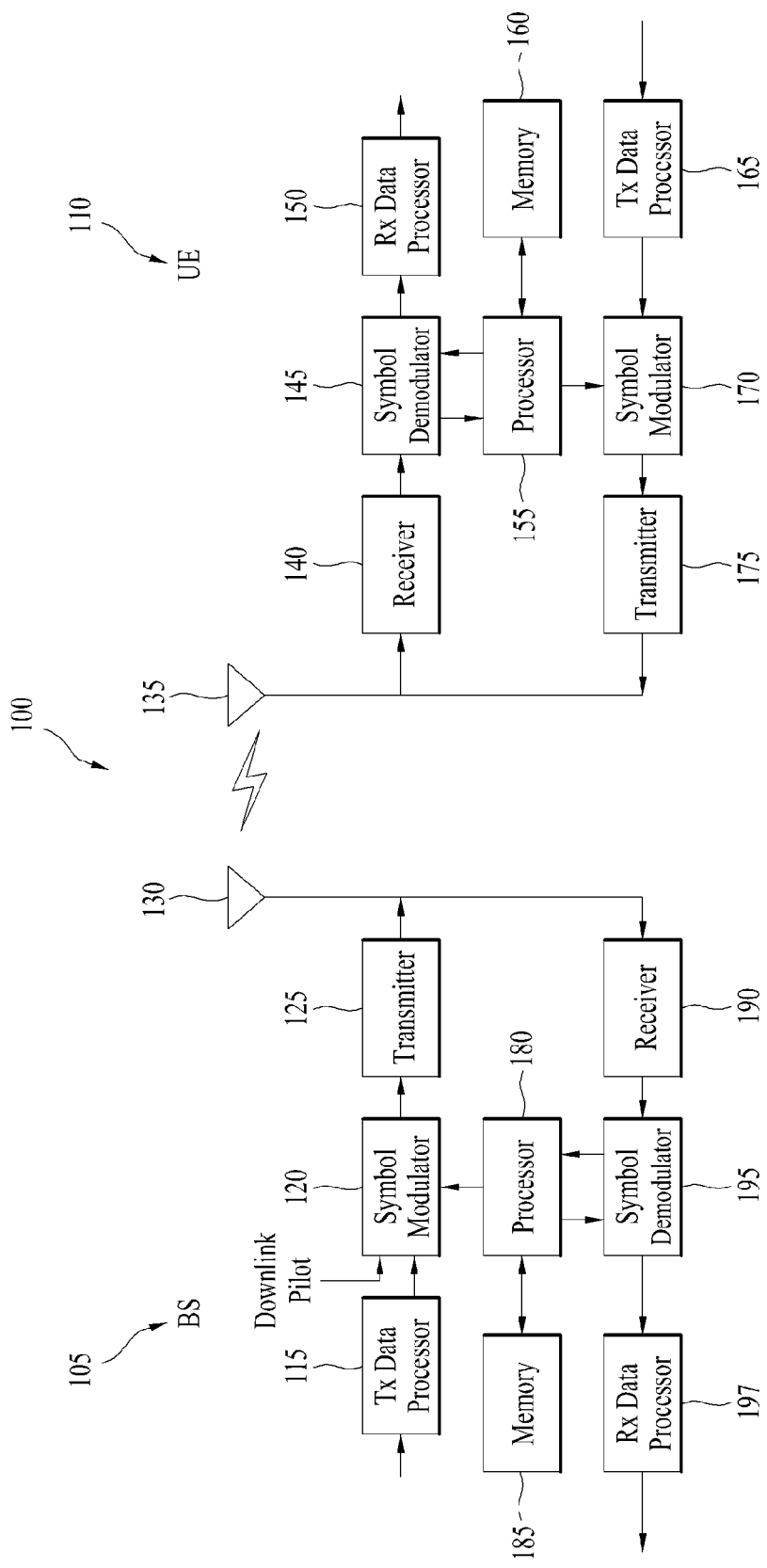
FIG. 1 is a block diagram for configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL. And, LTE-A (LTE-Advanced) is an evolved version of 3GPP LTE.

For clarity, the following description mainly concerns 3GPP LTE/LTE-A system. Yet, the technical idea of the present invention is non-limited by such a wireless communication system only. Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment and an base station may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A user equipment and a base station may be able to exchange RRC messages with each other via radio communication layer and RRC layers.

Figure 2:
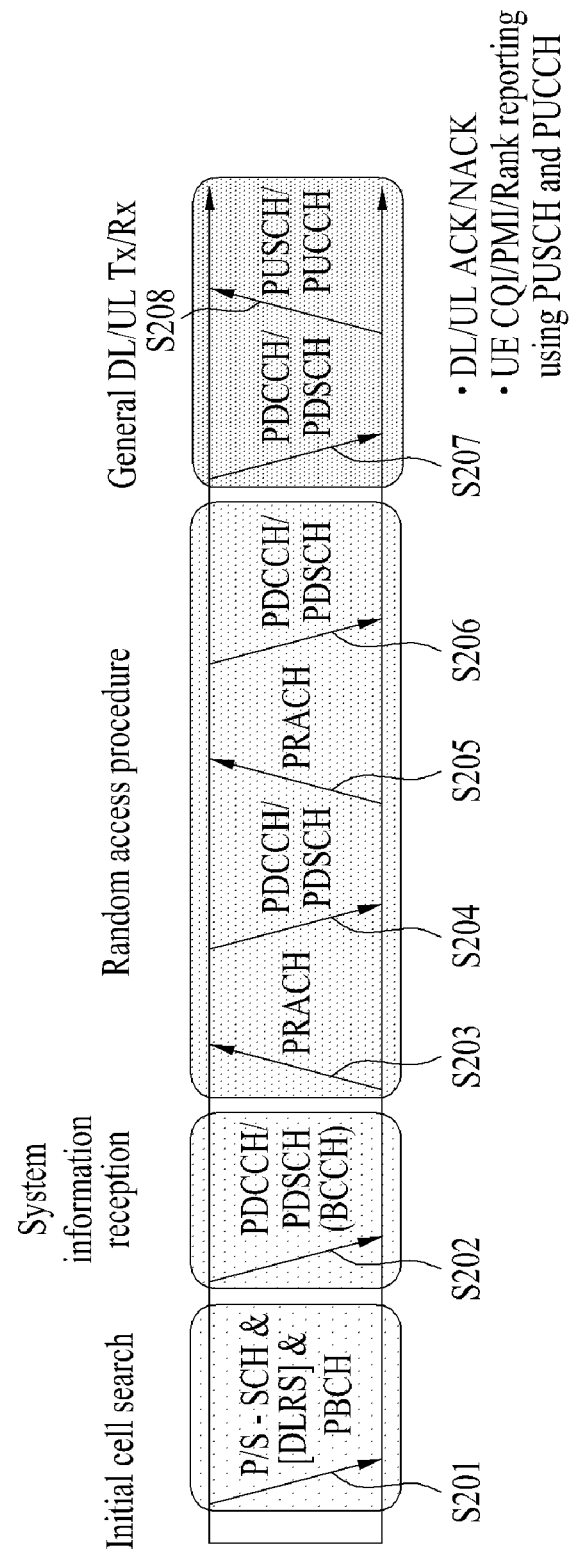
FIG. 2 is a diagram for describing physical channels used in a 3GPP LTE/LTE-A system as one example of a wireless communication system and a general signal transmitting method.

FIG. 2 is a diagram for describe physical channels used by a 3GPP LTE/LTE-A system for example of a wireless communication system and a general signal transmitting method using the physical channels.

Referring to FIG. 2, if a power of a user equipment is turned on again from a power-off state or the user equipment enters a new cell, the user equipment may perform an initial cell search job such as a job of matching synchronization with a base station and the like [S201]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and can obtain a detailed system information [S202].

Subsequently, the user equipment may be able to perform a random access procedure to complete the access to the base station [S203 to S206]. To this end, the user equipment may transmit a specific sequence as a preamble via a physical random access channel (PRACH) [S203] and may be then able to receive a response message via PDCCH and a corresponding PDSCH in response to the random access [S204]. In case of a contention based random access, it may be able to perform a contention resolution procedure such as a transmission S205 of an additional physical random access channel and a channel reception S206 of a physical downlink control channel and a corresponding physical downlink shared channel.

Having performed the above mentioned procedures, the user equipment may perform a PDCCH/PDSCH reception S207 and a PUSCH/PUCCH (physical uplink shared channel/physical uplink control channel) transmission S208 as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like. In this specification, HARQ-ACK is simply named HARQ-ACK or ACK/NACK (A/N). The HARQ-ACK includes at least one of a positive ACK (simply, ACK), a negative ACK (NACK), DTX and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 3:
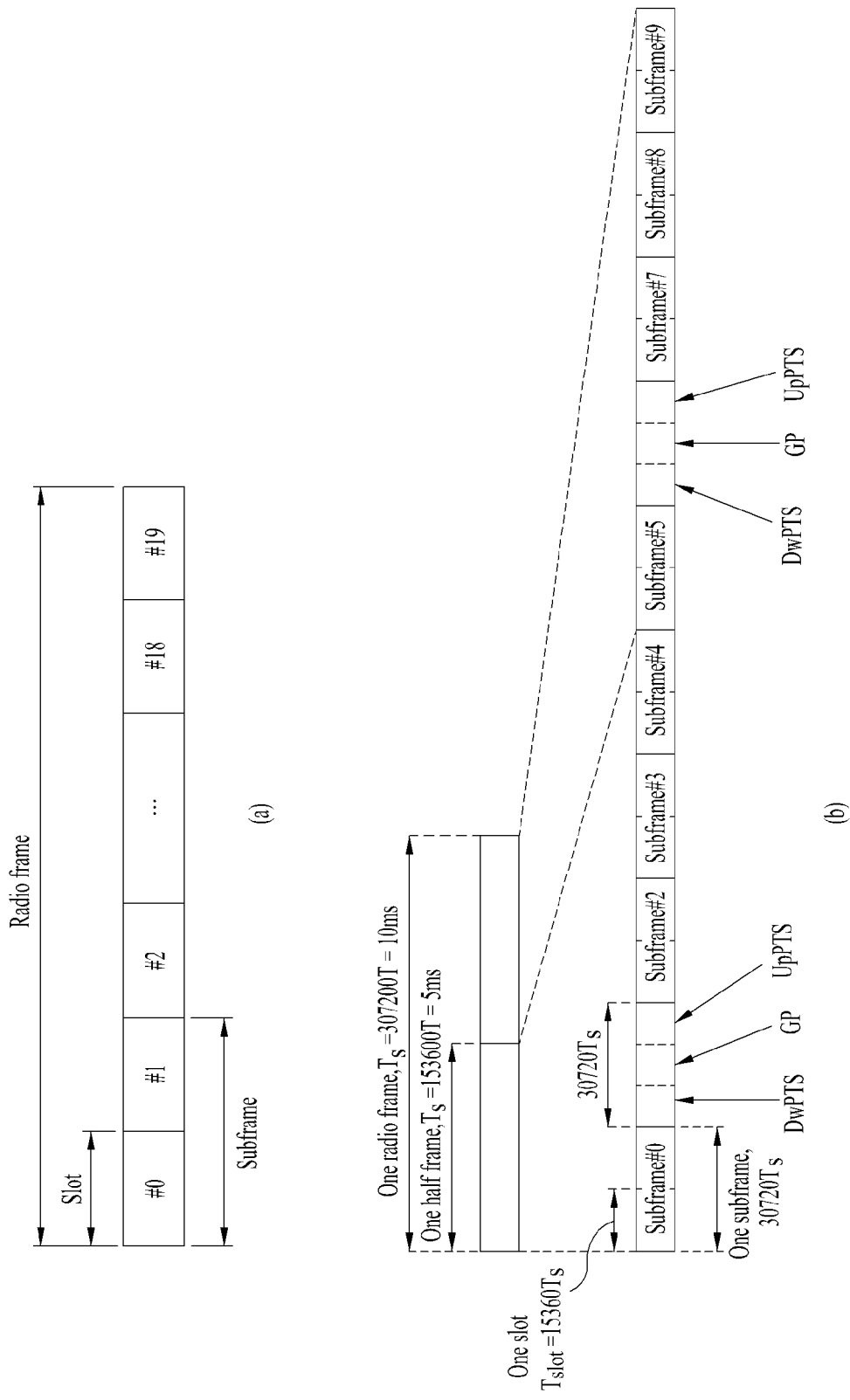
FIG. 3 is a diagram for one example of a radio frame used in a 3GPP LTE/LTE-A system as one example of a wireless communication system.

FIG. 3 shows one example of a structure of a radio frame used by a 3GPP LTE/LTE-A system for example of a wireless communication system.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 3 (a) shows one example of a structure of a radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 3 (b) shows one example of a structure of a radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are just exemplary. And, the number of subframes included in a radio frame, the number of slots included in the subframe and the number of symbols included in the slot may be modified in various ways.

Figure 4:
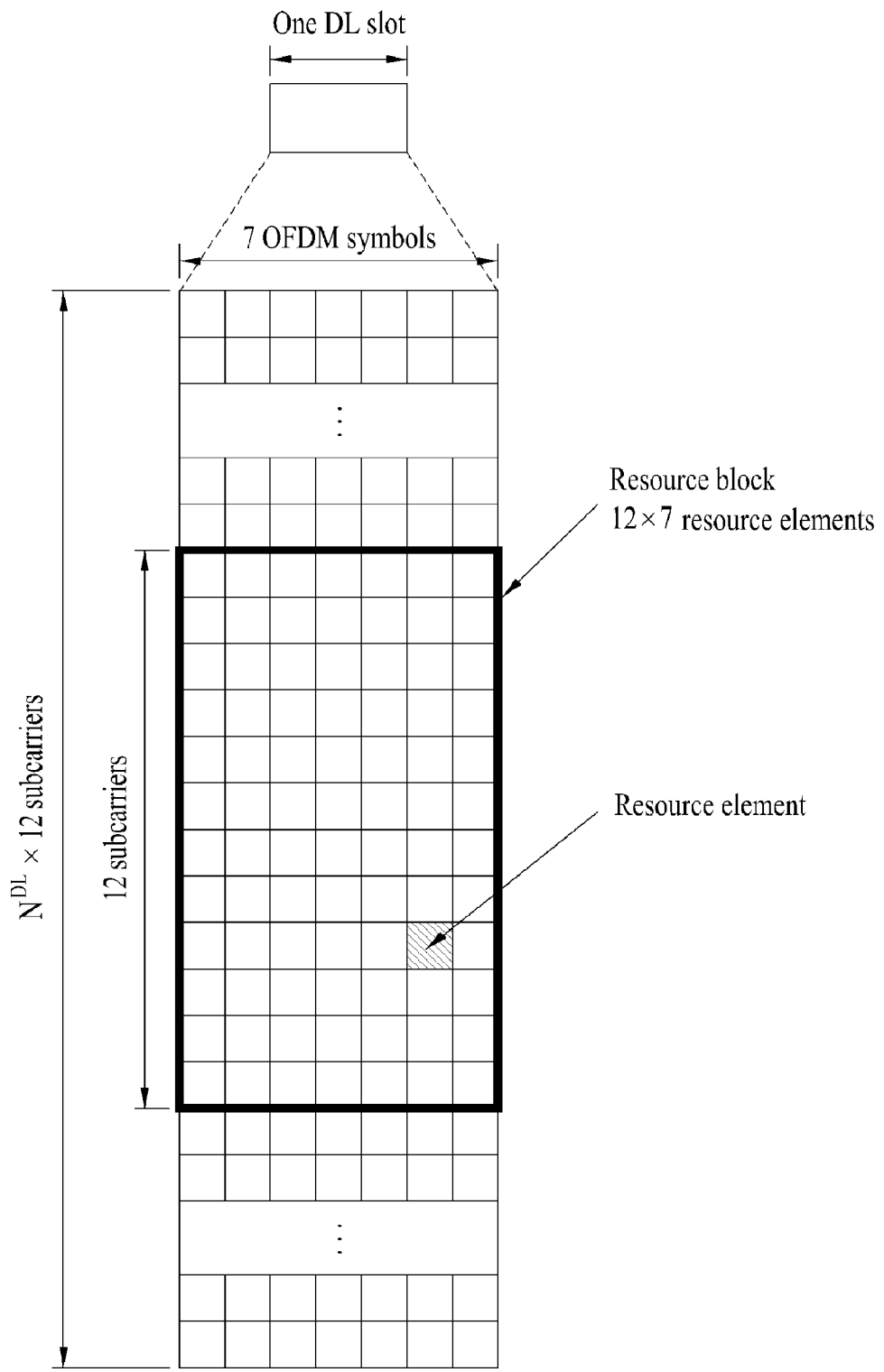
FIG. 4 is a diagram for one example of a resource grid of a downlink slot in a 3GPP LTE/LTE-A system as one example of a wireless communication system.

FIG. 4 is a diagram for one example of a resource grid of a downlink slot in a 3GPP LTE/LTE-A system for example of a wireless communication system.

Referring to FIG. 4, a DL slot includes a plurality of OFDM symbols in a time domain. One DL slot includes 7 or 6 OFDM symbols and a resource block may include 12 subcarriers in a frequency domain. Each element on a resource grid is called a resource element (RE). One RB includes 12×7 or 12×6 Res. The number $N_{RB}$ of RBs included in the DL slot depends on a DL transmission band. A structure of a UL slot is identical to that of the DL slot but OFDM symbol is replaced by SC-FDMA symbol.

Figure 5:
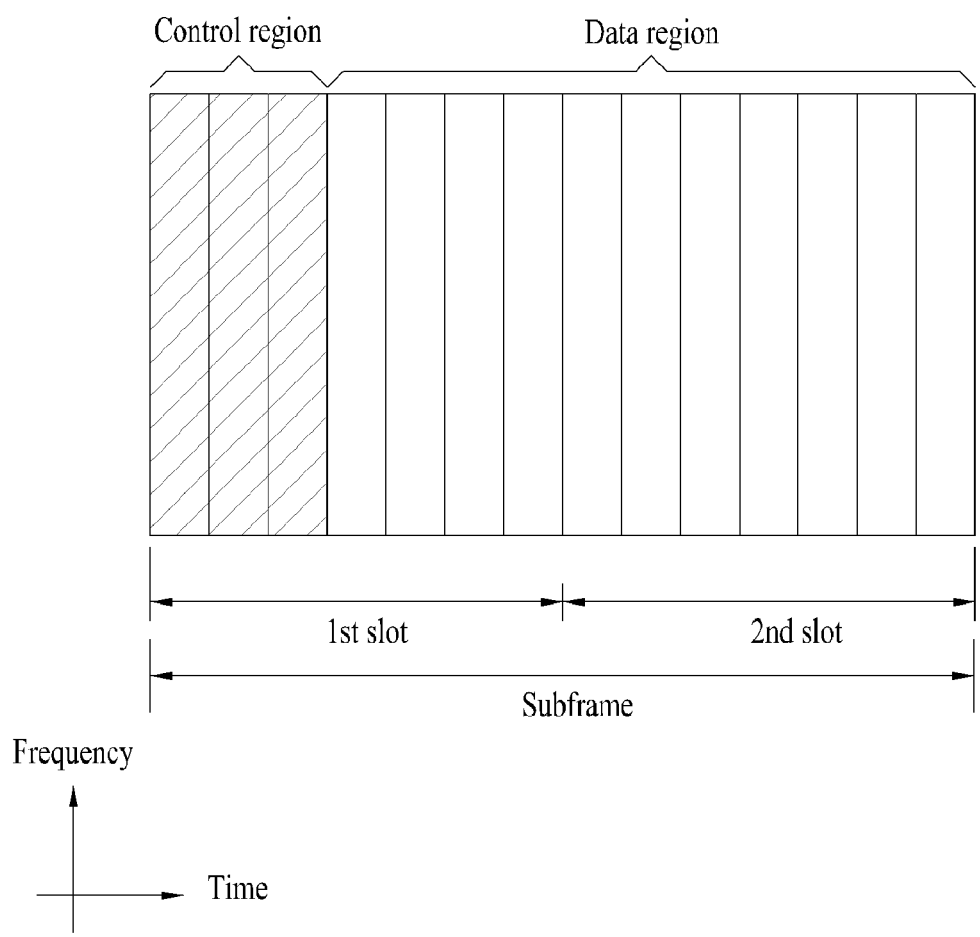
FIG. 5 is a diagram for one example of a structure of a downlink subframe in a 3GPP LTE/LTE-A system as one example of a wireless communication system.

FIG. 5 shows one example of a structure of a DL subframe in a 3GPP LTE/LTE-A system for example of a wireless communication system.

Referring to FIG. 5, maximum 3 or 4 OFDM symbols situated at a head part of a 1st slot of a subframe correspond to a control region to which a control channel is assigned. And, the rest of OFDM symbols correspond to a data region to which PDSCH (physical downlink shared channel) is assigned. For example, DL control channels used by 3GPP LTE may include PCFICH (Physical Control Format Indicator Channel), PDCCH (Physical Downlink Control Channel), PHICH (Physical hybrid ARQ indicator Channel) and the like. The PCFICH is transmitted on a 1st OFDM symbol of a subframe and carries information on the number of OFDM symbols used for a control channel transmission in the subframe. The PHICH carries HARQ ACK/NACK (acknowledgment/negative-acknowledgment) signal in response to a UL transmission.

Control information transmitted on PDCCH is called DCI (downlink control information). Regarding DCI formats, Format 0 is defined for uplink and Format 1, Format 1A, Format 1B, Format 1C, Format 1D, Format 2, Format 2A, Format 3, Format 3A and the like are defined for downlink. Depending on usages, DCI format selectively includes such information as hopping flag, RB assignment, MCS (modulation coding scheme), RV (redundancy version), NDI (new data indicator), TPC (transmit power control), cyclic shift DM RS (demodulation reference signal), CQI (channel quality information) request, HARQ process number, TPMI (transmitted precoding matrix indicator), PMI (precoding matrix indicator) confirmation and the like.

PDCCH carries transmission format and resource allocation information of DL-SCH (downlink shared channel), transmission format and resource allocation information of UL-SCH (uplink shared channel), paging information on PCH (paging channel), system information on DL-SCH, resource allocation information of an upper-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment can monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 6:
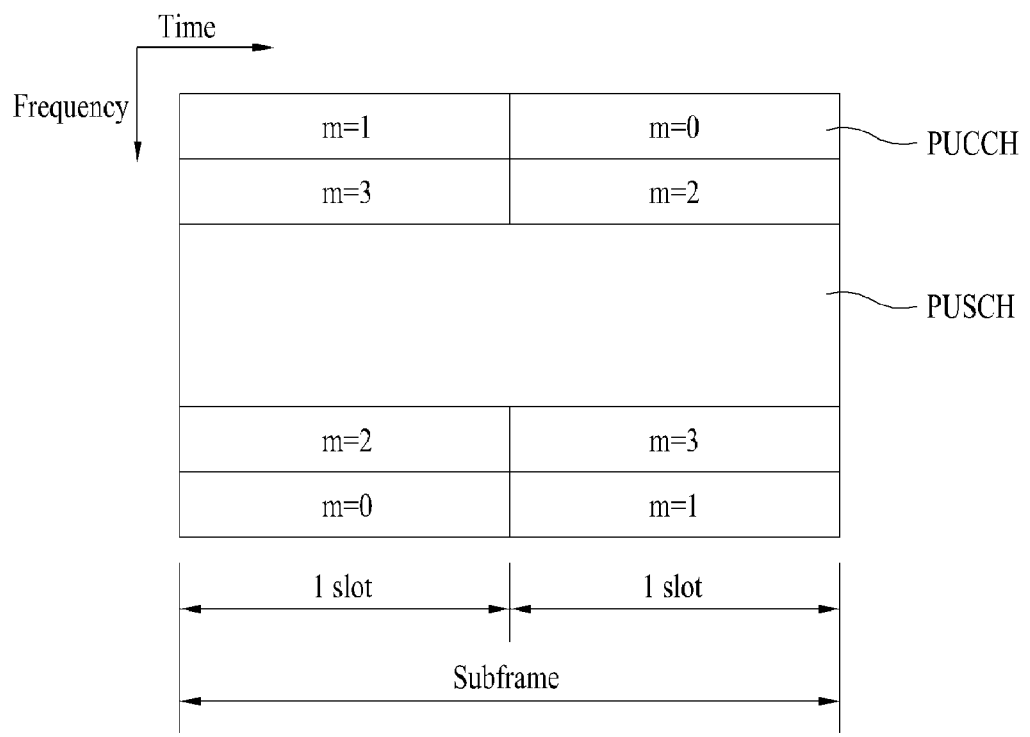
FIG. 6 is a diagram for one example of a structure of an uplink subframe in a 3GPP LTE/LTE-A system as one example of a wireless communication system.

FIG. 6 shows one example of a structure of a UL subframe used by a 3GPP LTE/LTE-A system for example of a wireless communication system.

Referring to FIG. 6, a UL subframe includes a plurality of slots (e.g., 2 slots). Each of the slots can include SC-FDMA symbols of which number varies in accordance with a CP length. The UL subframe is divided into a data region and a control region in a frequency domain. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH can be used to transmit the following control information.

SR (scheduling request): this is information used to request an uplink UL-SCH resource. This is transmitted by OOK (on-off keying).

HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.

CQI (channel quality indicator): This is the feedback information on a DL channel. MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbol remaining after excluding SC-FDMA symbol for a reference signal transmission from a subframe. In case of an SRS (sounding reference signal) configured subframe, a last SC-FDMA symbol of the subframe is excluded as well. A reference signal is used for coherent detection of PUCCH. And, the PUCCH supports 7 formats depending on transmitted informations.

Table 1 shows a mapping relation between PUCCH format and UCI in LTE.

TABLE 1

| PUCCH format | Uplink Control Information (UCI) |
|---|---|
| Format 1 | SR(Scheduling Request) (non-modulated waveform) |
| Format 1a | 1-bit HARQ ACK/NACK (SR presence/non-presence) |
| Format 1b | 2-bit HARQ ACK/NACK (SR presence/non-presence) |
| Format 2 | CQI (20 coded bits) |
| Format 2 | CQI & 1- or 2-bit HARQ ACK/NACK (20 bits) (corresponding to an extended CP only) |
| Format 2a | CQI & 1-bit HARQ ACK/NACK ((20 + 1) coded bits) |
| Format 2b | CQI & 2-bit HARQ ACK/NACK ((20 + 2) coded bits) |

FIG. 7 is a diagram for one example of a CA (carrier aggregation) system in a 3GPP LTE/LTE-A system as one example of a wireless communication system.

LTE-A system uses the carrier aggregation (or bandwidth aggregation) scheme that uses a wider UL/DL bandwidth by aggregating a plurality of IL/DL frequency bandwidths for a wider frequency bandwidth. Each of the smaller frequency bandwidths is transmitted using a component carrier (CC). The component carrier may be understood as a carrier frequency (e.g., a center carrier, a center frequency) for a corresponding frequency block.

Component carriers (CCs) can be configured contiguous or non-contiguous with each other in a frequency domain. A bandwidth of the CC may be limited to a bandwidth used by a legacy system to secure backward compatibility with the legacy system. For instance, a legacy 3GPP LTE system supports bandwidths of {1.4, 3, 5, 10, 15, 20} MHz but a 3GPP LTE-advanced (LTE-A) system can support bandwidths greater than 20 MHz using the above bandwidths supported by LTE only. A bandwidth of each component carrier (CC) can be independently determined. And, it is possible to configure asymmetric carrier aggregation in which the number of UL CCs and the number of DL CCs are different from each other. DL/UL CC is configured to be fixed to a system or may be configured semi-statically. For instance, referring to FIG. 7 (a), if there are 4 DL CCs and 2 UL CCs, it is possible to configure a DL-UL linkage in a manner of DL CC:UL CC=2:1. Similarly, referring to FIG. 6 (b), if there are 2 DL CCs and 4 UL CCs, it is possible to configure a DL-UL linkage in a manner of DL CC:UL CC=1:2. Unlike the drawing, it is possible to configure a symmetric carrier aggregation in which the number of UL CCs and the number of DL CCs are equal to each other. In this case, it is possible to configure a DL-UL linkage in a manner of DL CC:UL CC=1:1.

Although a total system bandwidth is configured with N component carriers (CCs), a frequency band, which can be monitored/received by a specific user equipment, may be limited to M (<N) CCs. Various parameters for carrier aggregation can be configured cell-specific, UE group-specific or UE-specific. Meanwhile, control information may be configured transmittable/receivable through a specific CC only. In this case, the specific CC may be named a primary CC (PCC) and the rest of CCs may be named secondary CCs (SCCs).

LTE-A uses the concept of cell to manage radio resources. The cell may be defined as the combination of DL resource and UL resource. And, the UL resource may not be mandatory. Hence, the cell may include DL resource only or may include DL resource and UL resource. In case that carrier aggregation is supported, a linkage between a carrier frequency (or DL CC) of DL resource and a carrier frequency (or UL CC) of UL resource may be indicated by system information. A cell operating on a primary frequency (or PCC)

may be named a primary cell (PCell) and a cell operating on a secondary frequency (or SCC) may be named a secondary cell (SCell).

The PCell is used by a user equipment to perform an initial connection establishment process or a connection re-establishment process. The PCell may mean the cell indicated in a handover process. The SCell may be configured after completion of RRC connection configuration and may be used to provide an additional radio resource. The PCell and the SCell may be generally called a serving cell. Hence, although a user equipment is in RRC_CONNECTED state, if the user equipment fails in configuring or supporting carrier aggregation, there exists one serving cell including PCell only. On the other hand, when a user equipment is in RRC_CONNECTED state, if the user equipment successfully configures the carrier aggregation, at least one serving cell exists. And, one PCell and all SCells are included in a whole serving cell. For the carrier aggregation, after an initial security activation process has been initiated, a network can configure at least one SCell in addition to PCell, which has been configured in an early stage of a connection establishment process, for a user equipment supportive of the carrier aggregation.

The present invention proposes an inter-cell interference cancellation (ICIC) scheme applicable in common to an inter-cell interference control between a macro base station and a pico or femto base station as well as to an inter-cell interference control between macro base stations. This ICIC scheme is identically applicable between low-output base stations such as pico base stations and femto base stations. Hence, in a heterogeneous communication system having base stations of various types exist therein, a vertical ICIC scheme for an interference control between base stations of different types is applicable in common as well as a horizontal ICIC scheme for an interference control between base stations of the same type.

According to the ICIC scheme, when a base station transmits a signal in downlink or a user equipment transmits a signal in uplink, an inter-cell interference control is performed in a manner of coordinating a transmit power for a corresponding scheduled resource. In particular, a transmit power is decreased for a resource assigned to a cell edge user equipment of a neighbor cell, thereby reducing interference working on the cell edge user equipment in downlink or uplink. This ICC scheme using the transmit power control may be performed by a resource block (RB) unit in a frequency domain or a subframe unit in a time domain, for example.

Figure 8:
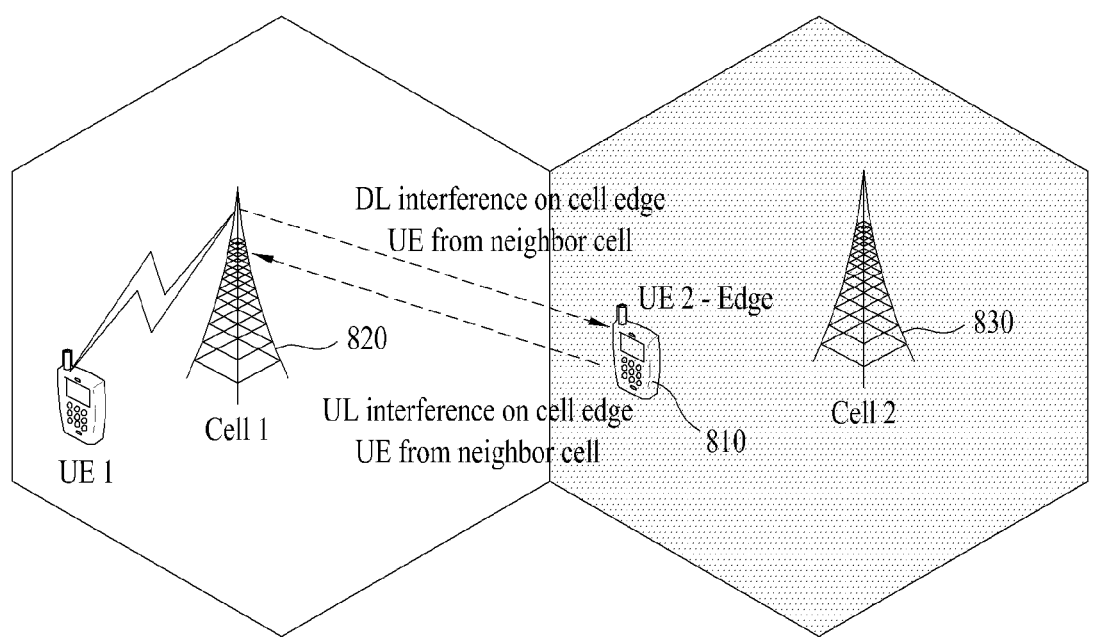
FIG. 8 is a diagram for one example of a situation of interference between neighbor cells.

FIG. 8 is a diagram for one example of a situation of interference between neighbor cells.

In the present invention, assume a system to which a basic ICIC scheme is applied as a method of performing an inter-cell interference control effectively. When a UE 2 8120 is located at a cell edge, as shown in FIG. 8, an influence of an interference between neighbor cells in DL and UL becomes seriously considerable, it may cause a situation that the interference should be reduced. Referring to FIG. 8, in a downlink situation, Cell 1 causes interference to a cell edge UE located in Cell 2. On the contrary, in an uplink situation, the UE 2 810 located at the cell edge in the Cell 2 causes interference to the Cell 1.

In order to resolve the above interference situations, a base station 820/830 of each of the cells perform ICIC scheme for a neighbor base stations. In particular, the base station 820/830 of each of the cells can perform the ICIC scheme in both a frequency resource region and a time resource region based on the resource structure mentioned in the foregoing description. In more particular, a transmission resource interval for a transmission with a low transmit power or a non-transmission resource interval is defined in each resource region and a cell edge UE of a neighbor cell is configured to receive a service in the corresponding resource interval. Therefore, interference influence can be alleviated or eliminated.

Figure 9:
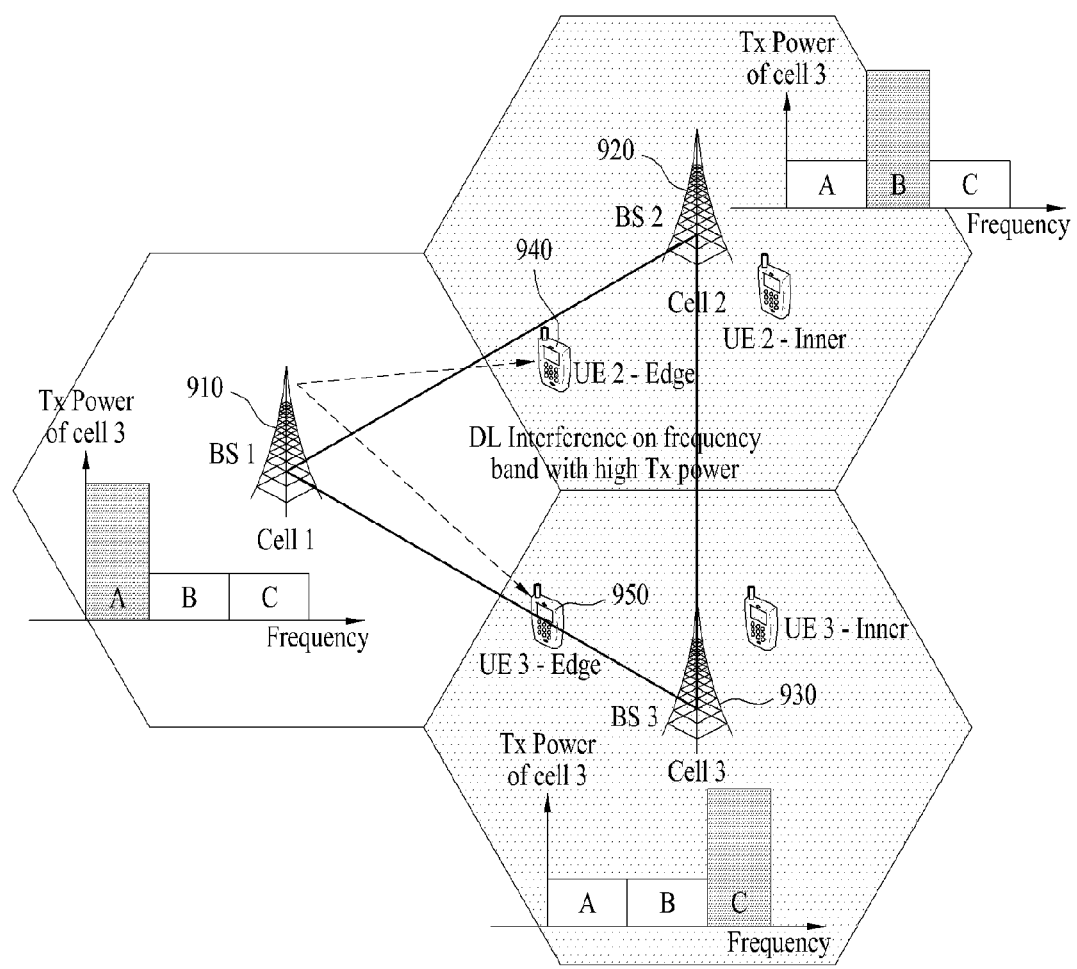
FIG. 9 is a diagram for one example of a method of applying DL ICIC in frequency domain.

FIG. 9 is a diagram for one example of a method of applying DL ICIC in frequency domain.

Referring to FIG. 9, a total frequency region is configured with three kinds of bands including a band A, a band B and a band C. Each base station configures a band with a low transmit power and a band with a high transmit power for each of the bands and is then able to perform an interference control based on the configured bands. In particular, since a BS 1 910 performs transmission with a low transmit power on the band B and the band C, a BS 2 920 can alleviate the interference in a manner of assigning the band B and the band C, each of which receives less interference, to a UE 2 940 located at a cell edge. Likewise, a BS 3 930 can also alleviate the interference in a manner of assigning the band B and the band C, each of which receives less interference, to a UE 3 950 located at a cell edge. In the above manner, each base station assigns a cell edge UE to a resource region protective from interference, thereby alleviating interference influence from a neighbor cell.

By the same principle, a method of performing ICIC in time domain is described with reference to FIG. 10 as follows.

Figure 10:
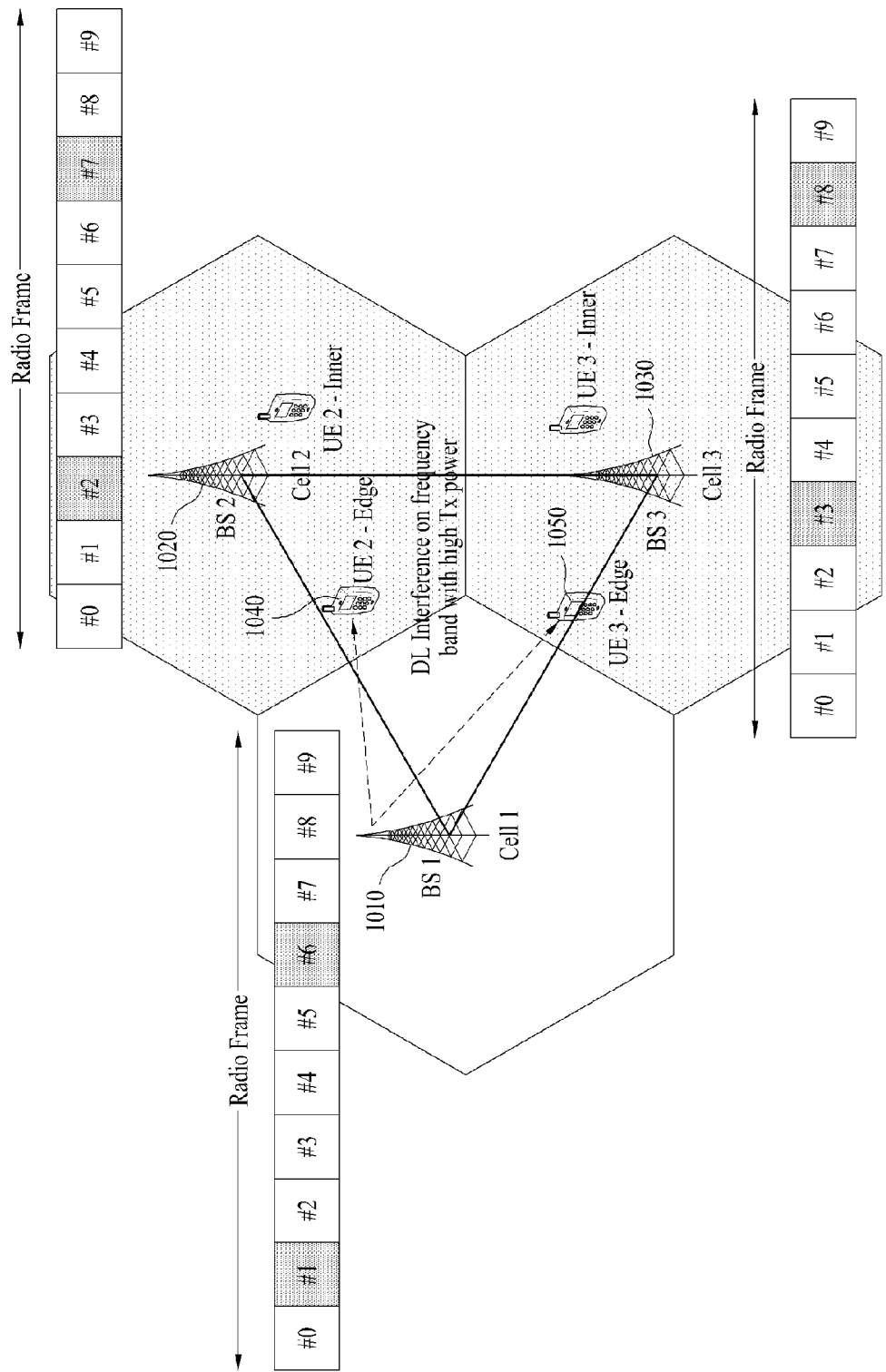
FIG. 10 is a diagram for one example of a method of applying DL ICIC in frequency domain.

FIG. 10 is a diagram for one example of a method of applying DL ICIC in frequency domain.

Referring to FIG. 10, each base station (BS) 1010/1020/1030 can use a specific time unit interval as a blanking interval in which a signal is not transmitted. The following description is made with reference to a subframe for one example of the specific time unit. Each of the base stations 1010, 1020 and 1030 configures a specific subframe as a blanking subframe not to cause an interference to a neighbor cell.

In particular, the BS 1 1010 configures a subframe index 1 (subframe #1) and a subframe index 6 (subframe #6) as blanking subframes and does not transmit any signals in the subframe #1 and the subframe #6. The BS 2 1020 configures a subframe #2 and a subframe #7 as blanking subframes and does not transmit any signals in the subframe #2 and the subframe #7. The BS 3 1030 configures a subframe #3 and a subframe #8 as blanking subframes and does not transmit any signals in the subframe #3 and the subframe #8.

In this case, the BS 2 1020 assigns a cell edge UE 2 1040, which receives serious interference influence from the BS 1 1010, to the subframe #1 or the subframe #6, thereby eliminating the interference from the BS 1 1010. In the same manner, the BS 3 1030 assigns a cell edge UE 3 1050, which receives serious interference influence from the BS 1 1010, to the subframe #1 or the subframe #6, thereby eliminating the interference from the BS 1 1010. Thus, each of the base stations 1010, 1020 and 1030 can eliminate the interference from the neighbor base stations by the resource allocation for the specific time interval (i.e., specific subframe interval). FIG. 10 just shows one example. A pattern of the blanking time interval (e.g., the blanking subframe) can be configured in various ways in accordance with system specifications and may be defined not as a non-transmission interval but as a time interval (e.g., subframe interval) with a low transmit power. Currently, in the 3GPP LTE-A system specification, a non-transmission subframe for an interference control in time domain is provided as Almost Blanking Subframe (ABS).

The inter-BS ICIC scheme is applicable in common to a heterogeneous network environment, in which base stations of various types exist, as well as to the operations between macro base stations mentioned in the foregoing description. For example, the heterogeneous network may mean a system environment in which low-output base stations including a pico cell and a femto cell coexist.

Figure 11:
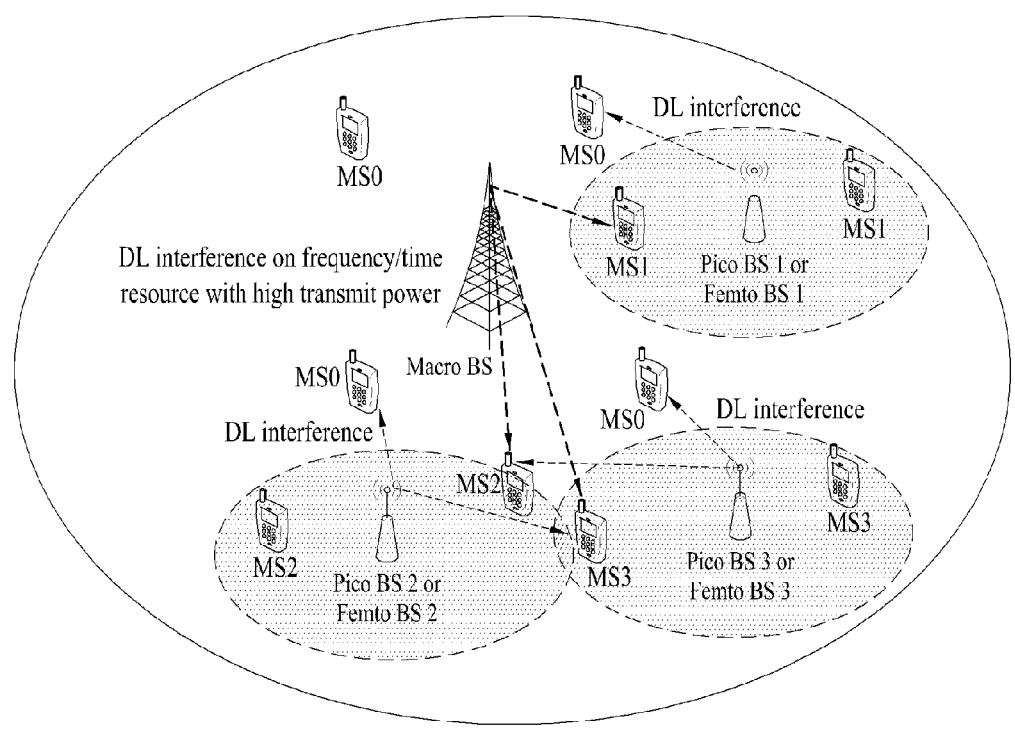
FIG. 11 is a diagram for one example of a situation of inter-cell interference in a heterogeneous network environment.

FIG. 11 is a diagram for one example of a situation of inter-cell interference in a heterogeneous network environment.

First of all, a heterogeneous system (or network) means a system configured using base stations of various types. In the heterogeneous network, a high-output macro base station having a wide coverage and a plurality of low-output pico base stations and a plurality of low-output femto base stations are operated together, whereby total system capacity can be maximized. The pico base station is mainly installed on a hot zone that needs to handle heavy data traffic. And, the femto base station supports a service of a very small coverage for individual homes and the like.

FIG. 11 shows one example of a configuration of a heterogeneous network (or system). In the heterogeneous network, interference is generated if the same carrier is simultaneously operated between overlaid base stations of different types. In particular, the interference situation among a macro base station, a pico base station and a femto base station may occur as well as the interference situation between macro base stations. Moreover, the interference situation may occur between a pico base station and each femto base station. Hence, an inter-cell interference control scheme is necessary for the interference situations. To this end, the ICIC scheme is used for the purpose of an interference control between a macro base station and a pico/femto base station as well as for an interference control between macro base stations. In doing so, the ICIC scheme may apply all techniques used for the interference control between the macro base stations and an additional scheme may be available for performance optimization. Moreover, if a link for communication between base stations exists despite that the base stations are differ from each other in type, it is able to apply a dynamic ICIC scheme of the same type. Therefore, in a heterogeneous communication system having base stations of various types exist therein, the present invention is applicable in common as a vertical ICIC scheme for an interference control between base stations of different types as well as a horizontal ICIC scheme for an interference control between base stations of the same type.

As mentioned in the foregoing description, the ICIC scheme is applicable in time and frequency domains. The core content of the ICIC scheme may be to determine a transmit power pattern in a time or frequency resource region. In particular, it is necessary to determine which frequency or time resource intervals will be transmitted with a high transmit power and a low transmit power, respectively or to determine which interval will be set as a non-transmission interval.

A transmit power pattern for an interference control or a pattern of a non-transmission interval may be configured in various ways in accordance with a system specification. In the present specification, if the above-mentioned interference control resource region and the pattern of the transmit power are fixedly operated in a manner of being agreed between base stations, such an operating scheme shall be named a static ICIC scheme. On the other hand, if the above-mentioned interference control resource region and the pattern of the transmit power are operated in a manner of being varied in accordance with an operating environment, such an operating scheme shall be named a dynamic ICIC scheme.

In order to perform the dynamic ICIC scheme, pattern information of a transmit power per resource needs to be exchanged and shared between base stations. In the 3GPP LTE system specification, a transmit power pattern information per frequency resource in downlink is exchanged through a message called Relative Narrow Transmit Power (RNTP) of a bitmap type and a transmit power pattern information per frequency resource in uplink is exchanged through a message called High Interference Indicator (HII). Since a resource giving a strong interference corresponds to a resource used by a cell edge user equipment (UE) in case of uplink, an information on a cell edge user equipment allocated resource is exchanged through an HII message of a bitmap type. In the 3GPP LTE-A system specification, ABS pattern information in time domain is exchanged between base stations.

The present invention relates to a method of operating a dynamic ICIC scheme effectively and proposes a method of effectively determining how much portion a transmission resource interval for a transmission with a low transmit power or a non-transmission resource interval will occupy in a total resource in order to alleviate interference on a neighbor cell.

<User Classification: Cell Edge User Equipment/Inner Cell User Equipment>

In accordance with a method of operating an ICIC scheme, it is necessary to classify user equipments receiving a service of a base station into an inner cell user equipment and a cell edge user equipment. In this case, the inner cell user equipment means a user equipment receiving a weak interference from a neighbor base station which is receiving a strong signal by being located close to a serving base station. And, the cell edge user equipment means a user equipment receiving a strong interference from a neighbor base station which is receiving a weak signal by being located at a coverage edge of a serving base station. A base station is able to perform an efficient ICIC scheme in a manner of classifying all user equipments (users) into one of the above two types. And, this classification is based on a measurement report made by a user equipment. In particular, if a long-term received signal measurement result of a serving base station and a neighbor base station is reported to the serving base station by a user equipment, the serving base station can identify an inner cell user equipment (or an inner user) and a cell edge user equipment (or a cell edge user) from each other with reference to the corresponding value.

For instance, if a long-term received signal power of a specific user equipment of a serving base station is greater than that of a neighbor base station by a predetermined value, the specific user equipment can be identified as an inner cell user equipment. Otherwise, the specific user equipment can be identified as a cell edge user equipment. In 3GPP LTE/LTE-A system, for example of a long-term received signal measurement, Reference Signal Received Power (RSRP) is defined. Moreover, each user equipment measures this value and is then able to report the measured value to a serving base station. A user equipment measures an RSRP value of a neighbor base station as well as an RSRP value of a serving base station. When the user equipment compares the RSRP of the neighbor base station to the RSRP value of the serving base station, if the RSRP of the neighbor base station is greater than the RSRP of the serving base station by a value equal to or greater than a threshold, the user equipment can report the measured value of the RSRP value of the neighbor base station and an identifier (ID) of the corresponding neighbor base station to the serving base station. Hence, the serving base station can be aware which user equipment is located close to the neighbor base station based on the measurement report and is then able to discriminate an inner cell user and a cell edge user equipment from each other based on the reported measurement value.

Similarly, in every communication system, a base station is able to discriminate an inner cell user equipment and a cell edge user equipment from each other based on a measurement of a user equipment. A long-term received signal measurement value means an average reception power received on a total band. Generally, an inner cell user equipment and a cell edge user equipment are discriminated from each other using a long-term received signal measurement value. Occasionally, a total band short-term CQI (channel quality indicator) information can be used to discriminate an inner cell user equipment and a cell edge user equipment from each other. The above-mentioned various kinds of the user discriminating methods are applicable to the contents of the present invention.

The present invention proposes an effective carrier operating method in performing an inter-cell interference control scheme (i.e., ICIC) in a carrier aggregation (CA) system in which a multitude of carriers are configured. To this end, each base station sorts carriers in aspect of inter-cell interference control, sets a level of interference protection for each of the sorted carriers (this level may be named an interference protective level) or a priority of interference protection for each of the sorted carriers (this priority may be named an interference protective priority), and is then able to exchange and share this information with a neighbor base station. Each base station is able to perform user scheduling and ICIC in accordance with the interference protective level set for each of the carriers based on the exchanged information. The base station can perform carrier assignment to inner cell user equipments and cell edge user equipments in accordance with the interference control level for each of the sorted carriers and is also able to perform interference based scheduling.

The technology proposed by the present invention is applicable to every communication system that operates a multitude of carriers. This technology is identically applicable to an interference control between a macro base station and a pico/femto base station in a heterogeneous system as well as to an interference control between macro base stations. In the following description, the technology proposed by the present invention is schematically explained and its functions are then explained in detail.

The technology proposed by the present invention intends to perform an effective ICIC function in a CA-based system in a manner that each base station sets a different interference control level for each carrier, i.e., a priority for interference protection in the CA-based system operating a multitude of carriers and that the corresponding base stations exchange the corresponding information with each other. In particular, since an interference protective priority is set for each carrier, a carrier having a highest priority can receive a best interference protection. Therefore, a cell edge user equipment can be protected from interference from a neighbor base station in a manner of mainly performing a control and data resource allocation of the cell edge user equipment.

A scheme proposed by the present invention can be construed as performing a coarse ICIC based on an interference protective priority of a carrier and a fine ICI can be independently performed on a time/frequency resource in each carrier. Regarding the fine ICIC scheme performed for each carrier, an ICIC scheme of the same level is applicable but a different ICIC scheme may be applicable to each carrier in accordance with a priority set for each carrier. In particular, a cooperative transmission is performed on a carrier having a highest priority in a neighbor cell to increase a reception performance with the cooperative transmission rather than an interference protection. And, an interference protection is performed on a carrier having a priority next to the highest priority by muting like the conventional ICI scheme.

For another instance, it is able to apply a following method. First of all, in aspect of a neighbor cell, a more amount of a muting resource is allocated to a carrier having a highest priority and a less amount of a muting resource is assigned to a carrier having a low priority. In particular, a fine ICIC operation applied to each carrier may vary in accordance with a priority set for the corresponding carrier.

In another aspect, in a CA-based system, since a user equipment operating with a multitude of carriers has a default CC for monitoring control information and the like all the time, a base station is able to set this default CC as a carrier having a high priority for interference protection. In 3GPP LTE-A, a default CC is named PCell and the rest of CCs are named SCells. In particular, in case of a cell edge user equipment, safe receptions of control information and broadcast information are very important. If a default CC (i.e., PCell) of the cell edge user equipment is assigned as a CC having a high interference protective priority, it is able to effectively operate an inter-cell interference control.

The present invention targets an ICI operation performed in a manner of setting a level for an interference protection for each carrier by numerical expression and then exchanging the corresponding information between base stations. And, applying the numerically expressed information on the interference protection to an ICI operation is accessible with implementation issues of various types. In the present specification, for clarity of the description, information exchanged between base stations for the proposed technology shall be named one of a carrier priority indicator (CPI) information, a carrier preference indicator (CPI) information and the like and may be called one of various other names.

In the following description, a method for a base station to configure a CPI is explained.

First of all, a base station determines a priority of a carrier protective from interference among at least one or more component carriers and is able to manage a class of a component carrier in aspect of interference. In particular, the base station is able to configure a carrier priority indicator per CC.

And, an inter-neighbor cell (or an inter-neighbor base station) CPI can be configured to protect a CC having a high priority. For instance, a BS 2 can assign a lowest priority to a CC having a highest interference protective priority assigned thereto by a BS 1. Thus, if interference cooperation is actively performed on each CC, it is able to provide protection from interference caused by a neighbor base station.

Base stations exchange CPI information of each CC with each other via an inter-base station interface or by a radio signaling on radio channel (i.e., over-the-air signaling), thereby sharing the CPI information with each other. There are a static coordination for exchanging the CPI information and using the exchanged CPI information fixedly only in case of an initial deployment of a cell and a dynamic (or semi-static) coordination for exchanging and optimizing the CPI information in the course of cell operation.

A base station can intensively assign a CC configured as having small interference (i.e., a CC having a high interference protective priority) by CPI information as a default CC. And, it is able to minimize control channel interference in eICIC scheme using ABS/MBSFN by cross-scheduling.

A base station determines an interference protective priority reference for each configured carrier and is able use it for an interference based scheduling based on the determined interference protective priority level. In doing so, the base station numerically expresses the interference protective priority and is then able to configure CPI information with the corresponding priority value. Alternatively, the base station is able to configure a carrier with one of two levels including a high interference protective priority and a low interference protective priority.

In the following description, features and configuration type of a CPI, which is a core function of the present invention and corresponds to an interference control level information set for each carrier, settings, and a message creating method are explained in detail. And, a method of operating a carrier based on a CPI message sending scheme and CPI information is described as well.

First of all, base stations can exchange CPI information corresponding to a per-carrier interference control level information with each other. In this case, the CPI information is an indicator information indicating an interference control level for each carrier or a priority of interference protection for each CC. A length of a CPI information message is equal to a total number of CCs operated by a base station and each message element can be represented as X-bit information in accordance with a technical implementation scheme. The corresponding message is exchanged by mutual signaling for inter-base station coordination. A configuration and format of a CPU message and an inter-base station signaling method are described in detail as follows.

First of all, a signaling message format of CPI information exchanged between base stations can be represented as Formula 1.

$$CPI^i = [CPI^i(0), CPI^i(1), \ldots CPI^i(k-1)] \quad \text{[Formula 1]}$$

In Formula 1, the k indicates the number of CCs of an $i^{th}$ base station. The $CPI^i(k-1)$ indicates a CPI metric value for a $k^{th}$ CC. For instance, in case that 5 CCs are configured, a bitmap may include 5-bit information. In particular, this information is X-bit information having a length Y. In this case, the X is an interference coordination level metric bit number. For instance, when the interference coordination level metric bit number is identified as High/Medium/Low only, 2 bits are enough. Hence, X is equal to 2 (X=2).

A format of CPI information can be represented as two kinds of informations. In particular, according to Format 1, a high priority can be mapped to a high CPI information value (i.e., the mapping is performed in a manner of raising a priority for protecting from interference if a CPI information value increases). And, according to Format 2, a high priority can be mapped to a low CPI information value (i.e., the mapping is performed in a manner of raising a priority for protecting from interference if a CPI information value decreases).

Neighbor set management for CPI configuration signaled between base stations is described as follows. First of all, a base station is able to create a CPI information (e.g., a CPI message) based on CPI informations received from at least one neighbor base station and a strength of a signal received from the neighbor base station (cf. CPI information creation shall be described in detail later). In doing so, the base station should determine a neighbor set (i.e., neighbor base stations) for the CPI information creation. In doing so, the neighbor set can be determined depending on the two situations as follows.

To this end, in an initial cell deployment stage, the base station scans a neighbor cell (or a neighbor base station) (in a network listening mode) and is then able to order neighbor base stations in order of a higher received signal. Alternatively, the base station sets a threshold in advance, recognizes base stations, from which signals are received over the threshold, as neighbor base stations, and is then bale consider CPI information from the recognized base stations. In an operation state, the base station can update the neighbor base station set with a measurement report (e.g., a measurement report of RSRP of signals received from the neighbor base stations by the user equipment). And, the updated neighbor base station set can be used as a neighbor set for handover.

Methods for each base station to signal a CPI message can include: 1) a wired interface between base stations (e.g., X2 interface in 3GPP LTE/LTE-A system); 2) a wireless interface between base stations; 3) a radio signaling (i.e., over-the-air signaling) (in-band, out-of-band), and the like.

The aforementioned CPI information creation is further described as follows. First of all, a base station can create a CPI message using CPI informations received from at least one or more neighbor base stations and measurement values of received signal strengths from the neighbor base stations. In doing so, the base station calculates a carrier preference metric (CPM), which is a metric for a CPI message creation, maps the CPM to a final CPI message, and then sends the mapped message to a neighbor base station. A CPI message configuring method is summarized as follows.

First of all, a base station can configure a CPI message of its own based on another CPI message received from at least one neighbor base station (neighbor cell) and a received signal strength measurement value of a measured neighbor base station. To this end, the base station needs to measure a signal strength of a signal received from at least one neighbor base station. And, the base station can configure the CPI message received from each of the at least one neighbor base station in such a form as $CPI^j$ (j=0, 1, 2, ..., ($N^i$−1)). In this case, the $N^i$ indicates the number of the neighbor base stations having sent the CPI messages. And, the strength of the received signal of the neighbor base station measured by an $i^{th}$ base station can be represented as Formula 2.

$$R^i = [R^i(0), R^i(1), \ldots, R^i(N^i-1)] \quad \text{[Formula 2]}$$

In Formula 2, the $R^i$ indicates the strength of the received signal of the neighbor base station measured by an $i^{th}$ base station. And, the $N^i$ indicates the number of the measured neighbor base stations.

Based on the $CPI^i$ value and the $R^i$ value, the base station is able to calculate CPM. The CPM calculated by the base station can be represented as Formula 3. In this case, CPM format may be dependent on CPI format. CPM Format 1 is the format for mapping a high priority if a CPI value is high. And, CPM Format 2 is the format for mapping a high priority if a CPI value is low. Such CPM can be represented as Formula 3.

$$CPM^i(k) = f(CPI^{j_k}(k), R^i) \quad \text{[Formula 3]}$$

where $j_k \in$ Neighbor set using the carrier 'k'

Referring to Formula 3, a base station can create CPM in function of CPI information received from neighbor base stations and measured values of strengths of signals received from the neighbor base stations. In doing so, functions of various types are applicable. For example, the following configuration can be provided as Formula 4.

$$CPM^i(k) = \sum_{j_k} CPI^{j_k}_{Normalized}(k) R^i_{Normalized}(j_k) \quad \text{[Formula 4]}$$

where $j_k \in$ Neighbor set using the carrier '$k$'

$$CPI^{j_k}_{Normalized}(k) = \frac{1}{C(j_k)} CPI^{j_k}(k)$$

$$R^i_{Normalized}(j_k) = \frac{1}{\sum_{j_k} R^i(j_k)} R^i(j_k)$$

In Formula 4, the $R_{Normalized}^i$ ($j_k$) indicates a normalized value of a received signal strength of a neighbor base station (i.e., an interference signal strength of a neighbor base station) and the $CPI_{Normalized}^{jk}$ indicates a normalized value of a per-carrier interference protective priority of a neighbor base station. For example, in the $i^{th}$ base station, the CPM value can be calculated using Formula 4.

Ordering can be performed in accordance with the calculated CPM value. According to Forma 1, CPM values are numbered from 0 to ($C^i$–1) in order of a higher size of the CPM value. According to Form a 2, CPM values are numbered from 0 to ($C^i$–1) in order of a lower size of the CPM value.

A base station maps the value numbered at each carrier index 'k' to a CPI message element and is then able to determine an output message element mapped in accordance with the CPI message format. This output message element is in the form of a bitmap or X-bits.

Format 1 creates a CPI message of a high value to enable a carrier index numbered with a high numeral to become a carrier most robust against interference. Format 2 creates a CPI message of a high value to enable a carrier index numbered with a high numeral to become a carrier most robust against interference.

In the following description, mapping rule implementations of various methods are explained.

Table 2 is referred to as one embodiment of the aforementioned Format 1.

TABLE 2

| Carrier index | CPM example | Ordered index by carrier preference) | Example 1 bitmap | Example 2 bitmap | Example 3 2 bits |
|---|---|---|---|---|---|
| 0 | 1.0 | 2 | 0 | 1 | 2 |
| 1 | 0 | 3 | 1 | 1 | 3 |
| 2 | 1.5 | 1 | 0 | 0 | 1 |
| 3 | 2.0 | 0 | 0 | 0 | 0 |

Referring to Table 2, the example 1 is a method of indexing and indicating a single carrier having a highest carrier priority (or preference). And, the example 2 is a method of indexing and indicating two carriers each of which has a highest carrier priority (or preference). Moreover, the example 3 is a method of indexing and indicating each carrier by dividing carrier priorities (or preferences) into several steps (e.g., 4 steps). Besides, each of the example 1 and the example 2 can be extended to a method of indexing and indicating a predetermined number of carriers each of which has a high priorities (or preferences).

In case of Format 2, if the ascending order of values and the descending order of values are applied in reverse, it is able to configure the same embodiment of Format 1.

In the following description, a carrier operating method based on CPI information is explained.

First of all, it is able to use various carrier operation methods according to CPI information corresponding to a per-carrier interference control level proposed by the present invention. Based on the CPI information, PCell/SCell assignment, carrier scheduling, inter-cell interference control applying method and the like can be operable variously. And, the CPI based carrier operating methods are included in the scope of the present invention as well. These methods are summarized per content as follows.

<PCell/SCell Assignment>

A base station is able to assign PCell of every cell edge user equipment to a CC having a highest CPI. In case of an inner cell user equipment, if a load is small, PCell can be assigned to a CC having a high CPI. In case of operation with X-bit CPI, a base station sequentially assigns CPI to PCell in high order of the CPI. In case of a cell edge user equipment, control information is transmitted on a carrier having a high CPI assigned as PCell (this case corresponds to cross-carrier scheduling). Hence, reception performance of control information can be enhanced and ICIC operation can be effectively performed.

<Carrier Scheduling>

A base station is able to schedule a cell edge user equipment with a CC having a highest CPI. In case of an inner cell user equipment, if a load is small, the base station can schedule an inner cell user equipment with a CC having a highest CPI. In case of operation with X-bit CPI, a base station sequentially can assign CPI to PCell in high order of CPI.

<ICIC Applying Method 1 (Muting (or Blanking) Scheme Applied Only)>

First of all, a base station is able to assign a muting (blanking) resource for interference protection to a carrier having a high CPI in a neighbor cell in a manner that a size of the muting (blanking) resource is greater than that of other carriers. For example, when there are two operation carriers, if a CPI of a carrier 1 of a neighbor cell is higher than that of a carrier 2, a base station is able to determine the carrier 1 to have a muting (blanking) resource rate of a total resource to become equal to a resource occupied rate of a cell edge user equipment of a neighbor cell. The base station can determine the carrier 2 to have a muting (blanking) resource rate of a total resource to become equal to a half (50%) of the resource occupied rate of the cell edge user equipment of the neighbor cell.

<ICIC Applying Method 2 (Using a Muting (Blanking) Scheme and a Coordinated Transmission Scheme>

First of all, as an interference control level 1, it is able to apply an inter-base station coordinated transmission scheme to a carrier having a highest CPI in a neighbor cell. Each base station can simultaneously transmit the same signal to a user equipment, which corresponds to a joint processing scheme for received signal enhancement of the user equipment. By the joint processing scheme, the user equipment obtains a combining gain to enhance a signal reception performance.

As an interference control level 2, a muting (blanking) scheme is applied to a carrier having a high CPI in a neighbor cell among the carriers except a coordinated transmission carrier. This is a neighbor cell interference eliminating method as a resource based ICIC. The muting (blanking) scheme is applied in time or frequency resource region.

Interference control level 3: a PMI (precoding matrix indicator) cooperative PMI is applied to a carrier having a high CPI in a neighbor cell among carriers except a coordinated transmission carrier and a muting (blanking) carrier. If MIMO precoding scheme is applied, inter-neighbor cell interference can be alleviated.

The above-mentioned interference control levels 1 to 3 are available in any combinations thereof and are applicable to a CA-based system having a random number of CCs. All kinds of carrier operating methods based on the above proposed and described CPI information can be operated in random combinations thereof, which is applicable to a CA-based system having a random number of CCs.

In the following description, vertical ICIC application of a heterogeneous network environment (e.g., macro base station & pico base station, macro base station & femto base station) is explained.

First of all, in a heterogeneous network environment, for example, a plurality of pico base stations and a plurality of femto base stations exist within a single macro base station. In aspect of the macro base station, if high CPI carriers are individually configured and operated for all pico base stations and all femto base stations, it is inefficient in aspects of usage and scheduling. In particular, if a plurality of pico base stations and a plurality of femto base stations receive interference protection in common for a resource region in which the interference protection is performed by a macro base station, it is further effective in aspect of the resource usage of the macro base station. In particular, it is able to control the interference on a plurality of small-output base stations using a minimum resource.

In this case, it is effective for a plurality of the pico and femto base stations to configure a high CPI carrier in common for a low CPI carrier of the macro base station. In a situation of one-to-many interference control between the macro base station and a plurality of small-output base stations within a macro coverage, the two kinds of schemes can be effectively operated as follows. The following two kinds of methods are operable on the assumption that types of base stations can be classified into pico/femto and the like. And, assume that a macro base station, a pico base station and a femto base station are identifiable.

First of all, according to a $1^{st}$ method, pico/femto base stations are clustered into several types. X pico/femto base station types are set, all pico/femto base stations are clustered into X types, and X low CPI carriers of a macro base station can be operated by being set as high CPI for each pico/femto base station type. If types are different from each other, high CPI carriers may be configured different from each other. For one example, pico/femto base stations are configured into two types, two low CPI carriers of a macro base station are mapped to the two types, respectively, and a high CPI can be set for each type. Thus, an interference control between a macro base station and a pico base station and an interference control between a macro base station and a femto base station can be performed using a minimum resource of the macro base station. Moreover, an interference control between the pico base station and the femto base station can be performed using CPI information per type. Besides, pico/femto base stations neighboring to each other can protect each other's high CPI carrier by different type configurations.

According to a $2^{nd}$ method, both a pico base station and a femto base station are configured to set high CPI for a low CPI carrier of a macro base station. In this case, although resource efficiency of the macro base station may be maximized, if the pico base station and the femto base station neighbor to each other, inefficiency of an interference control between the pico base station and the femto base station may possibly exist.

In the following description, a method for each base station to update a CPI message is explained.

First of all, if CPI setting value of another base station is received by being changed, one base station can update CPI information by performing the aforementioned CPI setting and configuration process again. If the CPI setting value is changed, each base station can signal a changed CPI message to neighbor base stations by event-triggering. Alternatively, the base station sets a predetermined time period, sends a CPI message at the corresponding point by the corresponding periods, and transmits information to the neighbor base stations. According to a method of exchanging a CPI message between base stations, by uni-directional signaling, if a specific base station transmits updated information to neighbor base stations, the neighbor base stations directly perform updates. By bi-directional signaling, after a specific base station makes a request for updated information to neighbor cells, the specific base station receives responses from the neighbor base stations and then performs an update.

So far, the above-description relates to a case of applying to a downlink for an inter-cell interference control, which is identically applicable to an uplink. There are two kinds of access methods. In a first access method, an uplink CPI can be configured to be dependent on a downlink CPI information using an information on an uplink CC configured as a pair with a downlink CC (DL CC). In a second access method, in case of an uplink CC, CPI creation and operation are taken into consideration independently from a downlink CC.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of controlling inter-cell interference in a wireless communication system supportive of a plurality of component carriers and a base station apparatus therefor are industrially applicable to various kinds of wireless access systems including 3GPP LTE, 3GPP LTE-A, IEEE 802 and the like.

What is claimed is:

1. A method of controlling an inter-cell interference by a first base station in a wireless communication system supportive of a plurality of component carriers (CCs), the method comprising:
   receiving a priority information on an interference protection for each of a plurality of configured component carriers from at least one neighbor base station;
   measuring a signal strength of a signal received from the at least one neighbor base station; and
   generating priority information for an interference protection for each of a plurality of component carriers configured in the first base station based on the received priority information and the measured signal strength of the at least one neighbor base station.

2. The method of claim 1, further comprising:
   transmitting the generated priority information for the interference protection for the each of a plurality of the component carriers to the at least one neighbor base station.

3. The method of claim 1, further comprising:
performing a scheduling on at least one user equipment served by the first base station based on the generated priority information for the interference protection for the each of a plurality of the component carriers.

4. The method of claim 1, wherein in the generating the priority information for the interference protection for the each of a plurality of the component carriers, for a priority for the interference protection in the at least one neighbor base station, a component carrier having a lowest or highest priority is assigned in the first base station.

5. The method of claim 4, wherein a user equipment located at an edge of at least one cell served by the first base station is assigned to the component carrier having the highest priority assigned thereto in the first base station.

6. The method of claim 1, wherein in the generating the priority information for the interference protection for the each of a plurality of the component carriers, the priority is generated as either a high level or a low level.

7. A first base station apparatus for controlling an inter-cell interference in a wireless communication system supportive of a plurality of component carriers (CCs), comprising:
a receiver configured to receive a priority information on an interference protection for each of a plurality of configured component carriers from at least one neighbor base station; and
a processor configured to measure a signal strength of a signal received from the at least one neighbor base station, the processor configured to generate priority information for an interference protection for each of a plurality of component carriers configured in the first base station based on the received priority information and the measured signal strength of the at least one neighbor base station.

8. The first base station apparatus of claim 7, further comprising:
a transmitter configured to transmit the priority information generated by the processor for the interference protection for the each of a plurality of the component carriers to the at least one neighbor base station.

9. The first base station apparatus of claim 7, wherein the processor is configured to perform a scheduling for at least one user equipment served by the first base station based on the generated priority information for the interference protection for the each of a plurality of the component carriers.

10. The first base station apparatus of claim 7, wherein if the processor generates the priority information for the interference protection for the each of a plurality of the component carriers, for a priority for the interference protection in the at least one neighbor base station, a component carrier having a lowest or highest priority is assigned in the first base station.

11. The first base station apparatus of claim 10, wherein the processor assigns a user equipment located at an edge of at least one cell served by the first base station to the component carrier having the highest priority assigned thereto in the first base station.

12. The first base station apparatus of claim 7, wherein if the processor generates the priority information for the interference protection for the each of a plurality of the component carriers, the priority is created as either a high level or a low level.

* * * * *